(12) United States Patent
Harmon et al.

(10) Patent No.: US 9,194,436 B2
(45) Date of Patent: Nov. 24, 2015

(54) SERRATED SHAFT DEBRIS COLLECTOR

(71) Applicant: GM Global Technology Operations LLC, Detroit, MI (US)

(72) Inventors: Caleb G Harmon, Hartland, MI (US); David Eddy, Milan, MI (US); Fred Lewis, Ann Arbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 535 days.

(21) Appl. No.: 13/659,279

(22) Filed: Oct. 24, 2012

(65) Prior Publication Data

US 2014/0112697 A1    Apr. 24, 2014

(51) Int. Cl.
*F16D 1/06*    (2006.01)
*F16D 1/072*    (2006.01)
*F16D 1/10*    (2006.01)

(52) U.S. Cl.
CPC ...... *F16D 1/06* (2013.01); *F16D 1/072* (2013.01); *F16D 1/10* (2013.01); *F16D 2001/103* (2013.01); *Y10T 403/16* (2015.01)

(58) Field of Classification Search
None
See application file for complete search history.

(56) References Cited

U.S. PATENT DOCUMENTS

| 7,387,462 B2 * | 6/2008 | Hacker ...................... 403/359.6 |
| 7,874,925 B2 * | 1/2011 | Dewhirst ...................... 464/181 |
| 8,020,299 B2 * | 9/2011 | Shirokoshi ...................... 29/893.2 |
| 2006/0075838 A1 * | 4/2006 | Hacker ...................... 74/10.45 |
| 2010/0021102 A1 * | 1/2010 | Fukumura et al. ............ 384/589 |

* cited by examiner

*Primary Examiner* — Victor MacArthur

(57) ABSTRACT

A chip or debris trap or collector retains chips, fragments and other debris generated when a serrated or splined, press fit connection is assembled between a shaft and another component such as a housing, gear, pulley or bearing. The chip collector includes a circumferential channel or groove disposed about the shaft adjacent the ring of serrations or male splines and an adjacent circumferential flange. An optional second channel or groove resides in the other component. As the shaft and the component are assembled, chips, fragments or other debris generated by the interference fit and axial sliding assembly of the components are collected in the channel or channels and retained there as the shaft fully seats within the other component.

18 Claims, 3 Drawing Sheets

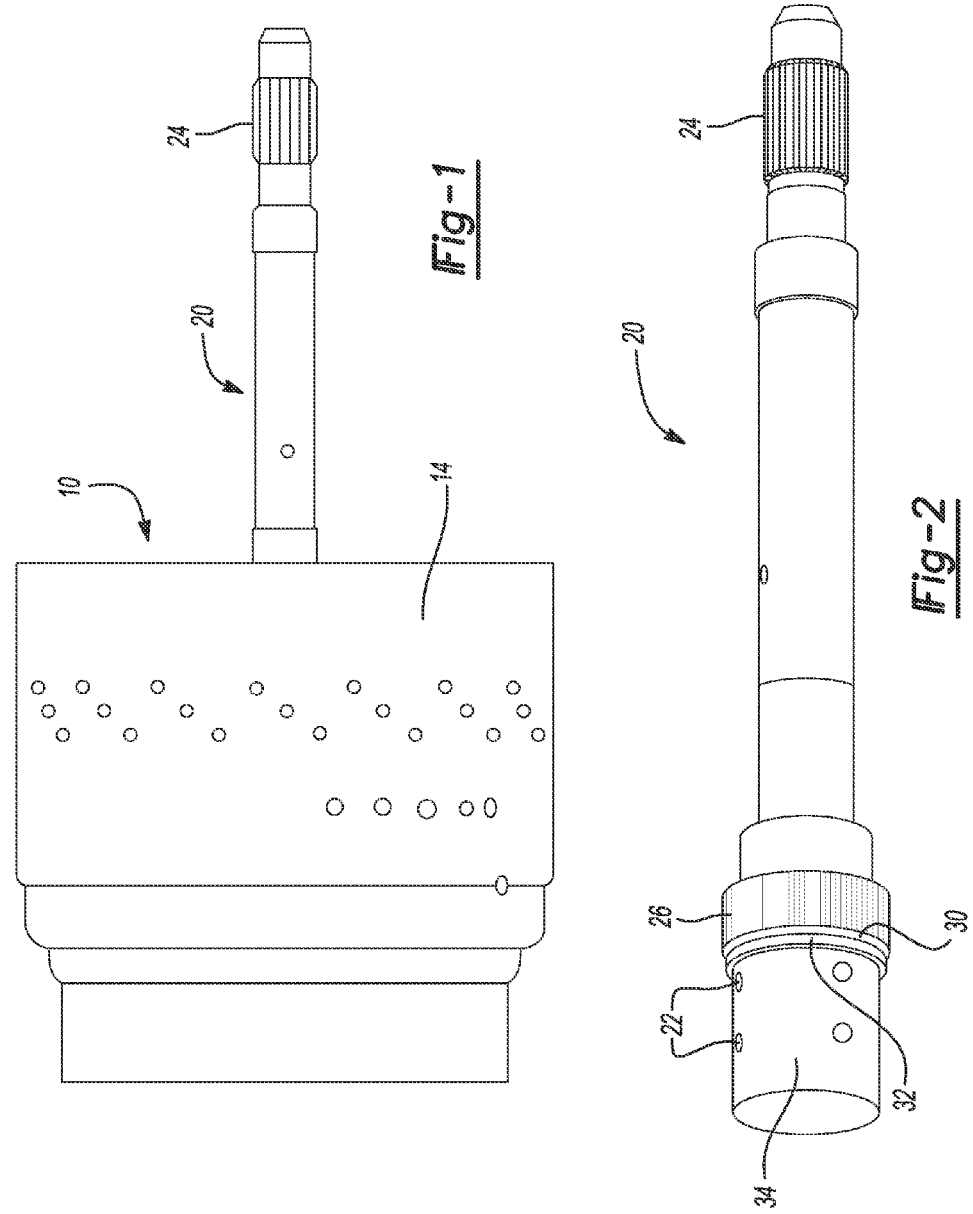

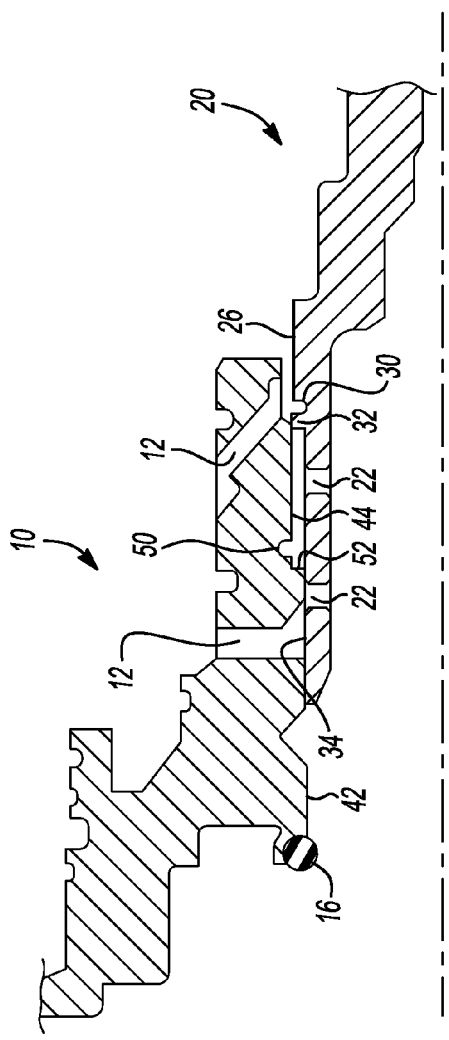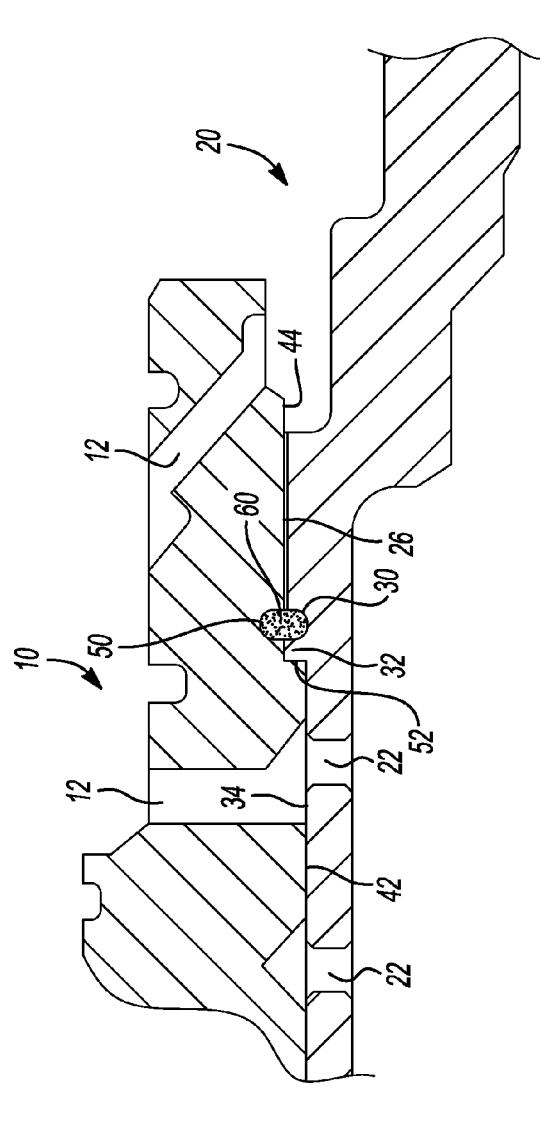

SERRATED SHAFT DEBRIS COLLECTOR

FIELD

The present disclosure relates to a debris collector of serrated shafts and more particularly to a collector for chips and debris resulting from press fitting a serrated or splined shaft into a complementary component.

BACKGROUND

The statements in this section merely provide background information related to the present disclosure and may or may not constitute prior art.

Many powerline components such as shafts, gears, pulleys, bearings and the like are assembly by press fitting one component of the other. One of several methods may be involved: heating the outer component to slightly expand it while positioning it on the inner component and allowing it to cool or, given a very small interference fit, simply forcing one component onto or into the other. Frequently the site of the press fit will include male serrations which fit within a smooth bore or complementary male and female splines which both greatly increase the torque carrying capability of the connection.

While a serrated or splined, press fit connection does provide increased torque carrying capability relative to a smooth press fit connection, there is often an unwanted consequence of utilizing such mating surfaces and that is the generation of fragments, chips and debris from one or both of the components. Such foreign material may fall away from the completed connection immediately, it may remained attached momentarily or for a lengthy period of time or it may be so secure that it remains with the connected components forever.

The last situation (permanent attachment), though not desirable, is generally not of concern but fragments, chips and debris generated by the connection process that fall away immediately or during operation are. Those which fall away or dislodge immediately should be removed by a cleaning process as they may otherwise remain with the assembled components until places in operation. The same is true of debris which remains initially attached but falls away in service. Ensuring the removal of all debris by a cleaning process is generally time consuming and, given the complexity of many components which include passageways, channels, blind openings and the like, may not always achieve the desired result. Clearly metal fragments, chips or debris circulating within, for example, the lubrication system of a device such as an internal combustion engine, manual or automatic transmission, transfer case or differential are to be avoided.

The present invention is directed to a means for trapping metal fragments, chips and debris in a serrated or splined, press fit connection between a shaft and a housing, a gear, a pulley, a bearing or other component.

SUMMARY

The present invention provides a chip or debris trap or collector which retains metal chips, fragments and other debris generated when a serrated or splined, press fit connection is assembled between a shaft and another component such as a housing, a gear, a pulley or a bearing. The chip trap or collector includes a circumferential channel or groove disposed about the shaft adjacent the ring of serrations or male splines and an adjacent circumferential flange. In the direction of assembly, the flange is first encountered, then the channel or groove and then the serrations or splines. The outer component, that is, the housing, the gear, etc., in addition to a smooth bore, optionally includes a second channel or groove that generally axially aligns with the channel or groove of the shaft when the two components are fully assembled. During the assembly process, any fragments, chips or other debris generated by the interference fit and axial sliding assembly of the components are driven into the channels or grooves and retained there when the outer component is fully seated on the shaft.

Thus it is an aspect of the present invention to provide a shaft intended for press fit assembly having a chip or debris collecting and retaining feature.

It is a further aspect of the present invention to provide a shaft having serrations and a chip or debris retaining feature adjacent the serrations.

It is a still further aspect of the present invention to provide a shaft having serrations, a chip or debris collecting channel adjacent the serrations and a chip retaining flange adjacent the channel.

It is a still further aspect of the present invention to provide a shaft having serrations, a chip or debris retaining channel adjacent the serrations and a chip or debris retaining channel in the mating component.

It is a still further aspect of the present invention to provide a shaft having a male spline set, a chip or debris retaining channel or groove adjacent the spline set and a circumferential flange adjacent the groove.

It is a still further aspect of the present invention to provide a shaft having a male spline set, a chip or debris retaining circumferential channel or groove adjacent the spline set and a debris retaining channel or groove in the mating component.

It is a still further aspect of the present invention to provide a shaft having serrations and a chip or debris retaining channel or groove adjacent the serrations that is aligned with a chip retaining channel or groove in a component such as a housing, gear or pulley when the component is fully assembled on the shaft.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a side elevational view of a shaft and housing assembly which incorporates the present invention;

FIG. 2 is a perspective view of the shaft according to the present invention;

FIG. 4 is a fragmentary, half sectional view of a portion of the shaft and housing illustrated in FIG. 1 according to the present invention during the assembly process; and FIG. 5 is an enlarged, fragmentary, half sectional view of a portion of the shaft and housing illustrated in FIG. 1 according to the present invention at the completion of the assembly process.

DETAILED DESCRIPTION

Figure 3:
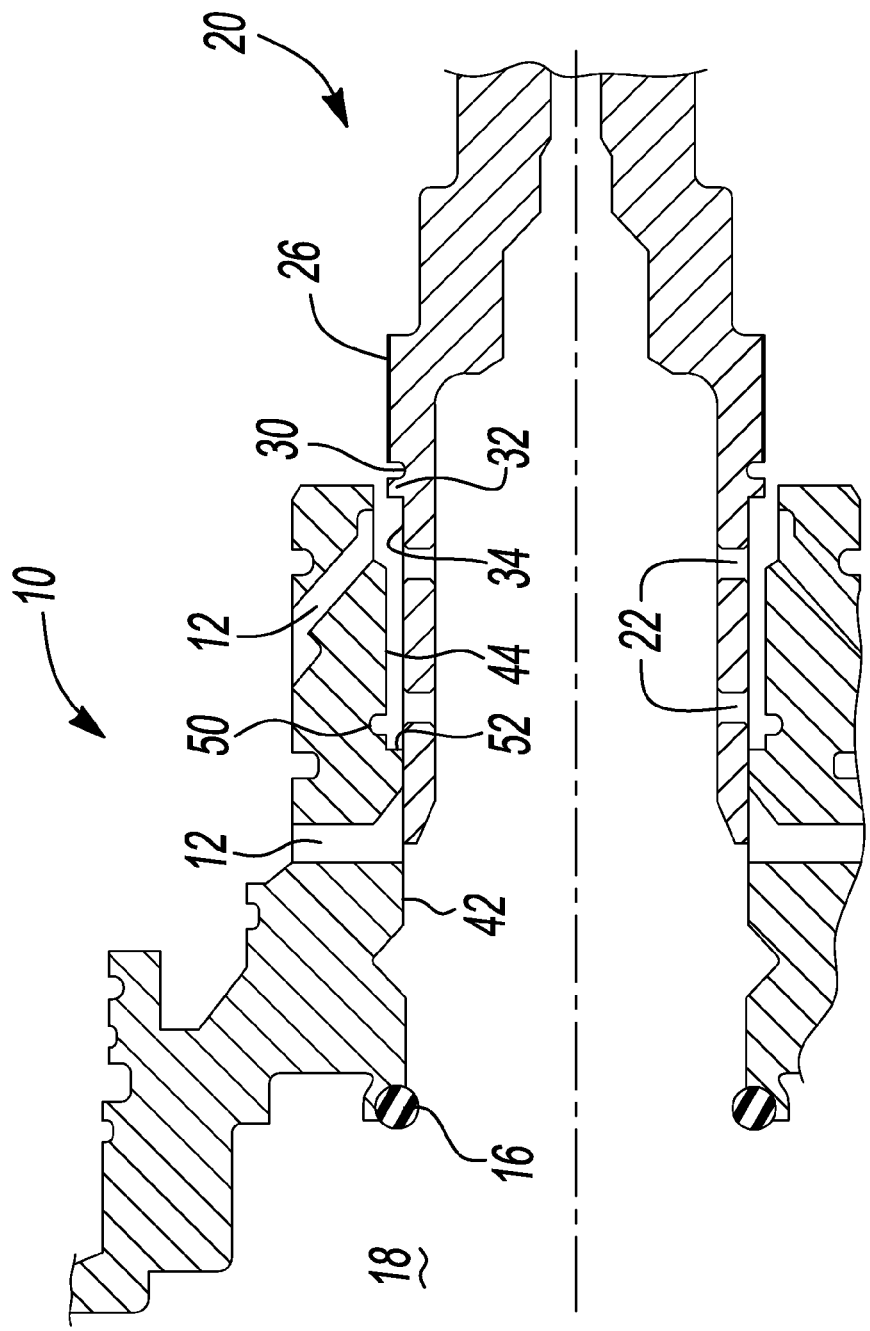
FIG. 3 is an fragmentary, full sectional view of a portion of the shaft and housing illustrated in FIG. 1 according to the present invention at the beginning of the assembly process.

The following description is merely exemplary in nature and is not intended to limit the present disclosure, application, or uses.

With reference to FIGS. 1, 2 and 3, a housing which may be, for example, a rotating component of an automatic transmission or other power carrying or delivering device, is illustrated and generally designated by the reference number 10. It will be appreciated that the housing 10 is exemplary and illustrative only and that other components such as gears, pulleys, bearings and the like may be utilized in its place. The housing 10 is circular, is preferably fabricated or a relatively lightweight and soft material such as aluminum and includes various radial and oblique passageways 12 and external features such as splines or gear teeth (not illustrated) and an outer, cylindrical wall 14 which may be received within associated components (also not illustrated). The housing 10 may also include an annular elastomeric seal 16 which engages and seals off a central region 18 of the housing 10.

Secured to the housing 10 by an interference press fit is a shaft 20. The shaft 20 may be solid or hollow as illustrated, is preferably fabricated of a relatively hard and strong material such as steel and rotationally couples the housing 10 to other components (not illustrated). As such, the shaft 20 may include, for example, a plurality of radial lubrication ports 22 at one end and a male spline set 24 at the other which drivingly engages a complementary female spline set (not illustrated).

It will be appreciated that the rotating housing 10 and the shaft 20 may typically be disposed with a housing of an automatic transmission (not illustrated) or similar fluid lubricated device and will therefore be exposed to and surrounded by a flow of transmission fluid or other lubricating oil. It is this environment in which metal fragments, chips and debris resulting from the press fit assembly process, if not contained or previously removed, may and generally will be flushed out of the shaft 20 during operation and be suspended and circulate with the transmission fluid throughout the transmission and possibly interfere with its operation.

As illustrated in FIGS. 2 and 3, the shaft 20 includes an axially and circumferentially extending region of serrations or splines 26. The serrations 26 may be any axially oriented, random or regular upsets such as alternating projections and grooves, ridges, teeth and the like that will engage, upset, abrade and grip a mating component such as the housing 10. Immediately adjacent the serrations or splines 26, toward the lubrication ports 22, is a first circumferential fragment, chip or debris collecting and retaining channel or groove 30. And adjacent the first chip collecting groove 30 (on the side opposite the serrations or splines 26) is a circumferential flange 32. It will be appreciated that the circumferential flange 32 axially defines one side of the first chip collecting groove 30 and that the region of serrations or splines 26 defines the other.

The shaft 20 terminates in a reduced diameter region 34 which includes the lubrication ports 22 and defines a diameter that is slightly larger than a cylindrical region 42 of reduced diameter of the housing 10, resulting in an interference press fit between the reduced diameter region 34 of the shaft 20 and the cylindrical region 42 of reduced diameter of the housing 10 when they are assembled.

The housing 10 also includes a smooth cylindrical bore 44 that has an inside diameter smaller than the nominal outside diameter of the serrations or splines 26 such that there is an upsetting and abrading interference fit between the serrations or splines 26 and the cylindrical bore 44 of the housing 10. The outside diameter of the circumferential flange 32 is smaller than the nominal outside diameter of the serrations or splines 26 and is substantially equal to the diameter of the smooth cylindrical bore 44 such that there is a tight clearance fit therebetween.

Proximate the end of the smooth bore 44 of the housing 10 is a second circumferential fragment, chip or debris collecting and retaining channel or groove 50. It should be appreciated that the second circumferential fragment, chip or debris collecting and retaining channel or groove 50 is optional. While it does increase the total volume available to collect and retain fragments, chips and other debris, it has generally been found that a single channel or groove such as the groove 30 in the shaft 20 suffices for this purpose.

At the end of the smooth cylindrical bore 44, adjacent the second chip collecting groove 50 is a shoulder 52 which transitions from the region of reduced diameter 42 to the larger diameter of the smooth cylindrical bore 44. It will be appreciated that when the housing 10 is fully assembled to the shaft 20, the first and the second chip collecting grooves 30 and 50 align or substantially align and the circumferential flange 32 on the shaft 20 abuts the shoulder 52 of the housing 10.

FIGS. 3, 4 and 5, illustrate steps in the assembly process with the housing 10 (or other component) and the shaft 20. In FIG. 3, assembly is just beginning as the reduced diameter region 34 of the shaft 20 is aligned with, piloted on and sliding into the cylindrical region of reduced diameter 42 of the housing 10. The serrations or splines 26 on the shaft 20 have not yet engaged the smooth bore 44 of the housing 10.

In FIG. 4, assembly is continuing as the shaft 20 has translated further into the cylindrical region of reduced diameter 42 of the housing 10. Note that the circumferential flange 32 has engaged the smooth bore 44 of the housing 10 with a tight clearance fit before the serrations or splines 26 engage the smooth bore 40, thereby effectively closing off the forward edge of the first chip collecting groove 30 before any such fragments, chips or debris are generated. In this regard, it should be appreciated that it is the leading edge of the serrations or splines 26 (adjacent the circumferential groove 30) that generates the fragments, chips and debris during assembly. Thus any fragments, chips or debris are prevented from moving beyond the circumferential flange 32 (to the left in FIG. 4) and contaminating or becoming lodged in, for example, the lubrication ports 22.

In FIG. 5, the shaft 20 is fully seated within and secured to the housing 10. At the outset, note that an upset, abraded, interference fit has been created between the serrations or splines 26 of the shaft 20 and the smooth bore 44 of the housing 10. In this regard, also note the presence of metal chips or debris 60 within the first and the second chip collecting grooves 30 and 50 that were generated as the serrations or splines 26 upset, abraded and removed material from the smooth cylindrical bore 44 of the housing 10. Next, note that the first chip collecting groove 30 and the optional second chip collecting groove 50 are axially aligned, thereby creating a relatively large circumferential channel about the shaft 20 in which metal fragments, chips and debris 60 from the assembly process may collect and be permanently retained. Finally, note that the flange 32 of the shaft 20 is abutting and fully seated against the shoulder 52 of the housing 10. These features and this action ensures (1) that the shaft 20 is positively and fully seated within the housing 10 and (2) that the first and the second chip collecting grooves 30 and 50 are fully or substantially fully aligned. Finally, note that in the fully assembled position, some of the lubrication ports 22 of the shaft 20 align with the radial passageways 12 in the housing 10 thereby facilitating fluid flow from the interior of the shaft 20 to components within the housing 10.

The description of the invention is merely exemplary in nature and variations that do not depart from the gist of the invention are intended to be, and are, within the scope of the invention and claims. Such variations are not to be regarded as a departure from the spirit and scope of the invention.

What is claimed is:

1. A chip collector for a press fit assembly comprising, in combination,
   a shaft having a region of serrations of a first diameter, a circumferential channel adjacent said region of serrations, a flange of a second diameter adjacent said channel and a cylindrical portion of a third diameter adjacent said flange, and
   a component adapted to be secured to said shaft, said component having a first bore of a diameter smaller than said first diameter and substantially equal to said second diameter and a second bore of a diameter smaller than said third diameter,
   whereby said flange slidingly seals against said first bore, said circumferential channel collects debris generated when said region of serrations engages and abrades said first bore during assembly of said component on said shaft and said cylindrical portion achieves a press fit in said second bore.

2. The chip collector for the assembly of claim 1 wherein said component is a housing.

3. The chip collector for the assembly of claim 1 further including a second channel in said first bore of said component, said second channel aligning with said circumferential channel in said shaft when said shaft and said component are fully assembled.

4. The chip collector for the assembly of claim 1 wherein said component includes a shoulder between said first bore and said second bore and said flange abuts said shoulder when said shaft and said component are fully assembled.

5. The chip collector for the assembly of claim 1 wherein said serrations are axially oriented, random or regular upsets.

6. The chip collector for the assembly of claim 1 wherein said shaft includes a plurality of lubrication ports that align with lubrication passageways in said component when said shaft and said component are fully assembled.

7. The chip collector for the assembly of claim 1 wherein said shaft is fabricated of steel and said component is an aluminum housing including an elastomeric seal.

8. A shaft and component assembly having a debris retainer comprising, in combination,
   a shaft having a plurality of serrations of a first diameter, a first circumferential debris receiving channel adjacent said plurality of serrations and a flange of a second diameter smaller than said first diameter adjacent said first debris receiving channel, and
   a component secured to said shaft, said component having a bore of a third diameter substantially equal to said second diameter and a second debris receiving channel in said bore, said bore upset and gripped by said plurality of serrations and providing a tight clearance fit on said flange during assembly,
   whereby said first and said second debris receiving channels align when said shaft and said component are assembled and debris generated during assembly of said component on said shaft is collected in said first and said second debris receiving channels.

9. The shaft and component assembly of claim 8 further including a cylindrical portion on said shaft adjacent said flange of a fourth diameter, a second bore in said component of a diameter smaller than said fourth diameter for receiving said cylindrical portion of said shaft and a shoulder between said bores.

10. The shaft and component assembly of claim 9 whereby said flange seats against said shoulder when said shaft and said component are fully assembled.

11. The shaft and component assembly of claim 8 wherein said serrations are axially oriented, random or regular upsets and said component is a housing for disposition in an automatic transmission.

12. The shaft and component assembly of claim 8 wherein said shaft includes a plurality of lubrication ports that align with lubrication passageways in said component when said shaft and said component are fully assembled.

13. A shaft and component assembly having a debris collector comprising, in combination,
    a shaft having means for abrading, said means for abrading having a first diameter, a circumferential channel for collecting debris adjacent said means for abrading and a flange of a second diameter smaller than said first diameter and adjacent said circumferential channel, and
    a component press fit on said shaft, said component having a bore upset and abraded by said means for abrading,
    whereby debris generated during press fitting of said component on said shaft is collected in said circumferential channel, and
    wherein said shaft includes a plurality of lubrication ports that align with lubrication passageways in said component when said shaft and said component are assembled.

14. The shaft and component assembly of claim 13 wherein said shaft includes a cylindrical portion adjacent said flange of a third diameter smaller than said second diameter and said component includes a second bore having a diameter smaller than said third diameter and a shoulder disposed between said bores.

15. The shaft and component assembly of claim 14 wherein said flange seats against said shoulder when said shaft and said component are fully assembled.

16. The shaft and component assembly of claim 13 wherein said means for abrading is one of splines and serrations and said component is a circular housing.

17. The shaft and component assembly of claim 16 wherein said serrations are axially oriented, random or regular upsets.

18. The shaft and component assembly of claim 13 further including a second channel in said bore of said component, said second channel aligning with said circumferential channel in said shaft when said shaft and said component are fully assembled.

* * * * *